United States Patent [19]

Nölken et al.

[11] 4,290,931
[45] Sep. 22, 1981

[54] AQUEOUS PLASTICS DISPERSION ON THE BASIS OF VINYL ESTER POLYMERS, PROCESS FOR THE MANUFACTURE THEREOF, AND COATING MATERIAL MADE THEREFROM

[75] Inventors: Ernst Nölken; Hans G. Oesterlin, both of Bad Soden am Taunus, Fed. Rep. of Germany

[73] Assignee: Hoechst Aktiengesellschaft, Frankfurt am Main, Fed. Rep. of Germany

[21] Appl. No.: 42,089

[22] Filed: May 24, 1979

[30] Foreign Application Priority Data

May 29, 1978 [DE] Fed. Rep. of Germany ....... 2823301

[51] Int. Cl.$^3$ ............................................... C08K 5/53
[52] U.S. Cl. ................... 260/29.6 RW; 260/29.6 MP; 260/29.6 E
[58] Field of Search .............. 260/29.6 RW, 29.6 NR, 260/29.6 MP, 29.6 E, 29.6 ME

[56] References Cited

U.S. PATENT DOCUMENTS

| | | | |
|---|---|---|---|
| 2,647,094 | 7/1953 | Hahn | 260/29.6 RW |
| 2,677,700 | 5/1954 | Jackson | 260/29.6 ME |
| 3,256,233 | 6/1966 | Hahn | 260/29.6 RW |
| 3,297,620 | 1/1967 | Anderson | 260/29.6 RW |
| 3,313,755 | 4/1967 | O'Rourke | 260/29.6 RW |
| 3,363,029 | 1/1968 | Verdol | 260/29.6 RW |
| 3,380,944 | 4/1968 | Kay | 260/29.6 RW |
| 3,396,135 | 8/1968 | Bishop | 260/29.6 RW |
| 3,444,151 | 5/1969 | Verdol | 260/29.6 RW |
| 3,567,672 | 3/1971 | Hobbs | 260/29.6 RW |
| 4,131,585 | 12/1978 | Feigin | 260/29.6 ME |

*Primary Examiner*—Paul R. Michl
*Attorney, Agent, or Firm*—Curtis, Morris & Safford

[57] ABSTRACT

Vinyl esters can be polymerized, optionally together with further monomers, in the presence of emulsifiers and with the aid of radical-forming initiators in an aqueous medium at elevated temperature. The simultaneous presence of dispersing agents is advantageous. For the application of the dispersions obtained as coating material it is recommended to add to them after their preparation a water-soluble salt of a copolymer of styrene and a maleic acid derivative. The plastics dispersions so modified have a high pigment binding capacity and are suitable above all for the manufacture of dispersion paints and paper coating compositions.

17 Claims, No Drawings

AQUEOUS PLASTICS DISPERSION ON THE BASIS OF VINYL ESTER POLYMERS, PROCESS FOR THE MANUFACTURE THEREOF, AND COATING MATERIAL MADE THEREFROM

It is known that aqueous polyvinyl ester dispersions are suitable as binder dispersions in dispersion paints and paper coating compositions. Such polyvinyl ester dispersions are for example prepared by polymerization of vinyl esters, optionally in combination with modifying comonomers, in aqueous dispersion, in the presence of an anionic emulsifier, and at a pH of from 4 to 6.8 which has to be maintained constant during the polymerization (see German Offenlegungsschrift No. 2,546,782).

Furthermore, there are described paper coating compositions containing alkaline casein solutions and aqueous polymer dispersions, which have been prepared by emulsion polymerization of mixtures of water-insoluble saponifiable, ethylenically unsaturated monomers and water-soluble, ethylenically unsaturated monomers in a pH range of from 3 to 6.5; as water-insoluble monomers, there are mentioned for example vinyl acetate and vinyl propionate. These coating compositions have generally a pH of from 8 to 12, and a solids content of from 35 to 65 weight %, the polymer portion of the total solids content being from 5 to 30 weight %, and the pigment portion being possibly from 50 to 90 weight % (see German Auslegeschrift No. 1,197,743 = British Pat. No. 1,021,887).

There have been disclosed other coating pastes for paper, which contain a mineral pigment, starch, a butadiene copolymer, and as stabilizer an alkaline solution of a copolymer of styrene and maleic anhydride or an alkyl ester of semiamide of maleic acid, in which solution the styrene copolymer should contain from 0.5 to 2 mols of maleic acid per mol of styrene (see U.S. Pat. No. 3,259,596).

It is the object of the present invention to provide an aqueous plastics dispersion on the basis of vinyl ester polymers, which has a high pigment binding capacity and which is suitable as binder dispersion, especially for dispersion paints or paper coating compositions.

This invention provides an aqueous plastics dispersion on the basis of a vinyl ester polymer, which comprises a water-soluble salt of a copolymer of styrene and maleic acid anhydride or a semiester or semiamide of maleic acid, the copolymer containing styrene units and comonomer units in a ratio of from 1.5:1 to 6:1.

The invention provides furthermore a process for the manufacture of an aqueous plastics dispersion on the basis of a vinyl ester polymer, which comprises polymerizing a vinyl ester, optionally in combination with a copolymerizable further monomer, in known manner in aqueous dispersion, and mixing the polymer dispersion so obtained with an aqueous solution of a salt of a copolymer of styrene and maleic acid or a semiester or semiamide of maleic acid, the copolymer containing styrene units and comonomer units in a ratio of from 1.5:1 to 6:1.

Advantageously, the plastics dispersion contains a dispersing agent. Suitable are for example salts of polyacrylic acid, polymethacrylic acid, polyvinylsulfonic acid or polyphosphoric acid, for example sodium tripolyphosphate, and especially organo-phosphorus compounds having 1,2, 3 or 4 phosphono groups (—PO(OH)$_2$), preferably phosphonoalkanes and phosphono-methylamines. By "phosphono-alkanes" there are to be understood monophosphono-alkanes and diphosphono-alkanes as well as partial esters thereof with aliphatic alcohols, preferably alkanols having from 6 to 24 carbon atoms. By "phosphono-methylamines" there are to be understood tertiary aliphatic amines having 2 or 3 phosphonomethyl groups, and aliphatic $\alpha,\omega$-diamines having each 2 phosphonomethyl groups at the nitrogen atoms.

Monophosphono-alkanes are compounds of the formula (I)

in which R is a—preferably linear—alkyl radical having from 6 to 24, preferably 8 to 18, carbon atoms, which may be substituted by a phenyl, hydroxyl or carboxyl radical. Examples are n-hexanephosphonic acid, n-octanephosphonic acid, n-nonanephosphonic acid, n-decanephosphonic acid, n-dodecanephosphonic acid, n-tetradecanephosphonic acid and n-hexadecanephosphonic acid. The alkanephosphonic acids are prepared by rearrangement of trialkyl phosphites or reaction of dialkyl phosphites with olefins in the presence of peroxides, and subsequent complete hydrolysis of the alkanephosphonic acid diesters obtained.

Partial esters of monophosphono-alkanes are compounds of the formula (II)

in which R is a—preferably linear—alkyl radical having from 6 to 24, preferably 8 to 18, carbon atoms, which may be substituted by a phenyl, hydroxyl or carboxyl radical, and $R^1$ is a—preferably linear—alkyl radical having from 1 to 8, preferably 1 to 4, carbon atoms. Examples are the monomethyl esters, monoethyl esters, monopropyl esters and mono-n-butyl esters of the above-mentioned alkanephosphonic acids. The alkanephosphonic acid-monoalkyl esters are prepared by partial hydrolysis of the aforementioned alkanephosphonic acid diesters (see for example German Pat. No. 2,441,783).

Diphosphono-alkanes are compounds of the formula (III)

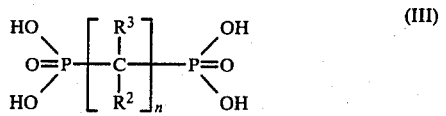

in which $R^2$ is a hydrogen atom or an alkyl radical having from 1 to 8 carbon atoms, $R^3$ is a hydrogen atom, a hydroxy group or an alkyl radical having from 1 to 8 carbon atoms and n is an integer from 1 to 10, preferably 1, 2, or 3. Methyl and ethyl radicals are preferred as alkyl radicals. Especially suitable compounds of formula (III) are, for example, methanediphosphonic acid, ethane-1,1-diphosphonic acid, ethane-1,2-diphosphonic acid, n-propane-1,3-diphosphonic acid, n-butane-1,4-diphosphonic acid, n-propane-1,1-diphosphonic acid, n-propane-2,2-diphosphonic acid, 1-hydroxyethane-1,1-diphosphonic acid and 1-hydroxy-n-propane-2,2-diphosphonic acid.

The diphosphono-alkanes of the formula (III) are prepared by reacting dialkyl phosphites with dihalogeno-alkanes, while diphosphono-hydroxyalkanes are obtained by reacting phosphorous acid with the corresponding carboxylic acid anhydrides, preferably acetic anhydride.

Tertiary aliphatic amines having 2 or 3 phosphonomethyl groups are compounds of the formula (IV)

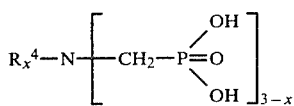

in which $R^4$ is an alkyl radical having from 1 to 6, preferably 1, 2 or 3 carbon atoms and x is zero or 1. A methyl or ethyl radical is preferred as alkyl radical $R^4$. Especially suitable compounds of formula (IV) are, for example, tris(phosphonomethyl)-amine, N-methyl-N,N-bis-(phosphonomethyl)-amine, N-ethyl-N,N-bis(phosphonomethyl)amine, N-propyl-N,N-bis(phosphonomethyl)-amine, N-butyl-N,N-bis(phosphonomethyl)-amine and N-hexyl-N,N-bis(phosphonomethyl)-amine.

Phosphonomethyl-diamines are compounds of the formula (V)

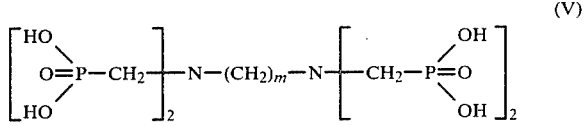

in which m is an integer from 2 to 14, preferably from 2 to 6. Especially suitable compounds of formula (V) are, for example, N,N,N',N'-tetrakis(phosphonomethyl)-ethylene diamine, N,N,N',N'-tetrakis(phosphonomethyl)-trimethylene diamine and the corresponding derivatives of tetramethylene diamine and hexamethylene diamine.

The phosphonomethylamines of formulae (IV) and (V) are prepared by reacting phosphorous acid with formaldehyde and ammonia or ammonium chloride or the corresponding amines or diamines in the presence of hydrogen chloride at a temperature of from 50° to 120° C., preferably 80° to 100° C.

The salts of organophosphorus compounds to be used according to the invention as dispersing auxiliaries must be soluble in water. Especially suitable are alkali metal salts, for example the sodium and potassium salts, and ammonium salts, i.e. salts of ammonia and salts of primary, secondary or tertiary aliphatic amines, preferably mono-, di- and trialkyl amines the alkyl radicals of which are either identical or different and each contain from 1 to 4 carbon atoms and which may be substituted by a hydroxy group. There are mentioned by way of example methylamine, ethylamine, propylamine, dimethylamine, diethylamine, dipropylamine, trimethylamine, triethylamine, tripropylamine, ethanolamine, diethanolamine, triethanolamine, N,N-dimethylaminoethanol and 2-amino-2-methyl-propanol-(1). Cyclic amines such as piperidine, morpholine and piperazine and linear polyamines such as ethylenediamine, diethylenetriamine and triethylenetetramine may alternatively be used.

The dispersing auxiliary is added in an amount of from 0.005 to 5% by weight, preferably 0.01 to 2% by weight (calculated on the total amount of monomers). It may be placed in the reaction vessel prior to the start of polymerization, or preferably the vessel is charged with part thereof prior to the start of polymerization and the remainder is added in dosed quantities during the course of polymerization. According to a special embodiment of the process of the invention, an aqueous solution of 5 to 30% by weight of the dispersing auxiliary is placed in the reaction vessel prior to the start of polymerization, then 30 to 55% by weight of the said auxiliary are added simultaneously with the dosage of the monomers, and finally 15 to 65% by weight are fed in dosed quantities to the polymerization mixture after termination of the monomer addition. The dispersing auxiliaries can be used either individually, in admixture with one another, or together with usual emulsifiers.

As styrene copolymers, there are used copolymers of styrene with maleic anhydride or a semiester or semiamide of maleic acid; the ratio of styrene units to comonomer units is from 1.5:1 to 6:1, preferably 2:1 to 4:1. The molecular weight (numerical average) of the styrene copolymer is generally in the range of from 500 to 50,000, preferably 1,000 to 20,000. Especially suitable are styrene copolymers having a molecular weight of from 1,200 to 5,000.

The styrene/maleic anhydride copolymers are prepared in known manner, preferably by polymerizing the monomers in bulk or in solution at a temperature of from 75° to 300° C. using a peroxide, for example dibenzoyl peroxide or dicumyl peroxide, as initiator. As solvent, there is generally used an aromatic hydrocarbon, for example toluene, cumene or xylene.

The styrene/maleic acid derivative copolymers are prepared by reaction of a styrene/maleic anhydride copolymer with an aliphatic alcohol or an aliphatic amine. As alcohol, there is used especially an alkanol having from 3 to 20, preferably 4 to 10, carbon atoms, for example n-butanol, n-hexanol, n-octanol or 2-ethylhexanol. A suitable amine is preferably an alkylamine having from 1 to 8, preferably 1 to 4, carbon atoms, for example methylamine, ethylamine, n-propylamine or n-butylamine. The reaction is carried out at elevated temperature, preferably of from 100° to 200° C. The reaction runs up to a rate of from 10 to 100%, preferably 20 to 80%; that is, in addition to ester and amide groups the copolymer contains from 50 to 95%, preferably 60 to 90% (relative to the total amount of carboxyl groups and ester and amide groups) of carboxyl groups.

The salts of styrene copolymers used in accordance with this invention must be water-soluble. Corresponding to the salts of organo-phosphorus compounds, alkali metal salts and ammonium salts are especially suitable. Generally, the salt of the styrene copolymer is used in an amount of from 0.1 to 20, preferably 0.5 to 10, weight % (relative to the total amount of vinyl esters and their comonomers). The salt of the styrene copolymer may be added to the polyvinyl ester dispersion per se, or it may be formed in situ by neutralization of the acid derivative contained in the reaction mixture. As neutralizing agents compounds having a basic reaction are used, preferably alkali metal hydroxides, alkali metal carbonates, ammonia and ammonium carbonate as well as the aforesaid primary, secondary or tertiary aliphatic amines. Neutralization is carried out in an aqueous medium at a temperature of from 50° to 80° C., preferably 65° to 75° C., and the amount of neutralizing agent is chosen in such a manner that the corresponding aqueous solution has a pH of from 6 to 11, preferably 7 to 10.

The vinyl ester polymers used in accordance with the invention are homo- or copolymers of vinyl esters. Suitable vinyl esters are above all vinyl esters of aliphatic monocarboxylic acids having from 1 to 10 carbon atoms, for example vinyl acetate, vinyl propionate, vinyl butyrate, vinyl caproate, vinyl laurate and vinyl decanates.

The vinyl ester copolymer is either a copolymer of different vinyl esters or a copolymer of a vinyl ester with another comonomer which is copolymerizable in aqueous dispersion. Preferably, the copolymer is binary or tertiary; alternatively, it may be composed of more than 3 monomers. The amount of comonomers is totally 60% at most, preferably at a maximum 40% (relative to the total amount of all monomers). Suitable comonomers are above all olefinically unsaturated compounds of the formula (VI)

in which $R^5$ is a hydrogen atom, an alkyl radical having from 1 to 4 carbon atoms, an alkoxy radical having from 1 to 4 carbon atoms, a nitrile group, a halogen atom, preferably a chlorine atom, or an alkoxycarbonyl group having from 2 to 12, preferably 2 to 9 carbon atoms, and $R^6$ is a hydrogen atom or a methyl group.

Suitable comonomers are especially olefins, for example ethylene and isobutylene; vinyl ethers, for example vinylmethyl ether, vinylethyl ether and vinyl-n-butyl ether; furthermore acrylonitrile and methacrylonitrile; vinyl chloride; acrylic acid esters and monohydric alkanols, for example methylacrylate, ethylacrylate, butylacrylate and 2-ethylhexylacrylate; methacrylic acid esters of monohydric alkanols, for example methylmethacrylate, ethylmethacrylate, butylmethacrylate and 2-ethylhexylmethacrylate. Alternatively, maleic acid diesters are suitable, especially those of monohydric aliphatic alcohols having from 2 to 10, preferably 3 to 8, carbon atoms, for example dibutyl maleate, dihexyl maleate and dioctyl maleate.

Polymerization of the respective monomers is carried out under known conditions in the presence of a radical-forming initiator, preferably a peroxy compound or an aliphatic azo compound. Suitable initiators are, for example, the alkali metal or ammonium salts or peroxydisulfuric acid or peroxydiphosphoric acid, or azo-$\gamma,\gamma'$-bis(4-cyanovaleric acid).

The initiator is used in an amount of from 0.05 to 1%, preferably 0.1 to 0.4% by weight (calculated on the total amount of monomers). Optionally, the initiator is used together with a reducing agent, for example an alkali metal sulfite, alkali metal thiosulfite, alkali metal dithionite, formaldehyde sodium sulfoxylate or a heavy metal salt. The initiator may be placed in the reaction vessel prior to the beginning of polymerization or added to the reaction mixture in dosed quantities, and this is valid, too, for the reducing agent. The polymerization is carried out at a temperature of from 25° to 90° C., preferably 40° to 75° C., the polymerization time being in the range of from 2 to 10 hours, preferably 3 to 8 hours, depending on the type and amount of vinyl monomers.

The vinyl ester polymers used in accordance with the invention have a reduced specific viscosity $\eta_{spec}/c$ in the range of from 2 to 30 dl/g, preferably 3 to 20 dl/g (measured in dimethyl formamide at a temperature of 25° C.). The plastics dispersion according to this invention on the basis of a vinyl ester polymer is prepared by mixing an aqueous polyvinyl ester dispersion, optionally containing a dispersing auxiliary, with an aqueous solution of a salt of a specific styrene copolymer, advantageously at a pH in the range of from 6 to 11, preferably 6 to 8.

Especially advantageous is the use of the above styrene copolymer salts in combination with hydroxyl group-containing polyethers being liquid or water-soluble under normal conditions; the molecular weight (numerical average) of these polyethers is generally in the range of from 200 to 6,000, preferably 400 to 3,000. Suitable polyethers are, for example, oxethylated or propoxylated compounds, such as reaction products of ethylene oxide or propylene oxide with long-chain alkanols, amines, carboxylic acids or phenols. Especially suitable are homo- or copolymers of propylene oxide, for example polypropylene oxides or ethylene oxide/propylene oxide copolymers.

Further additives which, if required, may be added to the plastics dispersion of the invention are (a) antifoaming agents such as tributyl phosphate or polysiloxanes, (b) anionic emulsifiers such as alkylbenzene sulfonates, alkyl sulfates or sulfates of oxethylated compounds, (c) preserving agents such as phenol, benzoic acid or chloroacetamide, (d) plasticizers such as dibutyl phthalate or alkylated aromatic hydrocarbons, (e) antifreeze agents such as glycol, propyleneglycol-(1,2) or glycerol, (f) water-soluble binders such as starch, starch ethers, phosphated starch, cellulose derivatives such as carboxymethylcellulose, casein, polyvinyl alcohol or polyvinylpyrrolidone, (g) optical brighteners, and (h) solvents lowering the minimum film-forming temperature of the plastics dispersion such as ethylglycol, butylglycol, ethylglycol acetate, ethyldiglycol acetate, butylglycol acetate or butyldiglycol acetate. The additive in question is added to the dispersion of the vinyl ester polymer together with the solution of the styrene copolymer salt, or it is mixed with the plastics dispersion already containing the styrene copolymer salt. The amount of additive does generally not exceed 10 weight %, preferably it is from 1 to 5 weight % (relative to the plastics dispersion).

The vinyl ester polymer dispersion according to the invention has a solids content of 40 to 65% by weight, preferably 45 to 55% by weight. The minimum film-forming temperature (MFT) is in the range of from $-10°$ to $+30°$ C., preferably 0° to 20° C., and the viscosity is from 10 to 1,000 mPa·s, preferably 30 to 500 mPa·s (measured according to Epprecht). The dispersion has a pH of from 3.5 to 9.0, preferably 4.5 to 8.0, and the dispersed polymer particles have an average diameter of from 0.05 to 1.0 μm, preferably 0.08 to 0.4 μm. The plastics dispersion is highly stable to shearing forces, have a very good pigment binding capacity and gives coatings having a high gloss. It is well compatible with inorganic pigments and fillers, and is therefore especially suitable as binder dispersion for the above-mentioned substances in paints and coatings of all kind, especially dispersion paints and paper coating compositions.

Suitable pigments and fillers for paper coating compositions are for example kaolin, calcium carbonate, titanium dioxide, zinc sulfate, barium sulfate (heavy spar) and satin white. These inorganic materials are used either alone or in combination with each other, in a total amount of 100 parts by weight per 2 to 100, preferably 3 to 30, parts by weight of vinyl ester polymer. The particle diameter of the pigments and fillers is usually in the range of from 0.1 to 100 μm, preferably 0.2 to 30 μm. When manufacturing paper coating compositions, it is advantageous to prepare first an aqueous pigment suspension containing a dispersing agent, to add subsequently an aqueous solution of one of the above water-soluble binders, and finally to mix this batch with the plastics dispersion. The pigment suspension would have a pH of from 7 to 11, preferably 8 to 10. It is recommended to add a water-soluble binder in an amount of from 0.5 to 30 weight %, preferably 2 to 15 weight % (relative to the pigment amount).

The following examples illustrate the invention, parts and percentages being by weight unless otherwise stated.

The abbreviations used in the examples have the following meanings:
ET = ethylene
VA = vinyl acetate
VC = vinyl chloride
RSV = reduced specific viscosity $\eta_{spec}/c[dl/g]$
MA = maleic anhydride
DMA = N,N-dimethylamino-ethanol
HEDP = 1-hydroxyethane-1,1-diphosphonic acid
MW = molecular weight
MR = molar ratio (styrene:comonomer)
Cop = copolymer
Terp = terpolymer
Ex = Example
Sol = solution

EXAMPLE 1

A vessel provided with agitator, internal thermometer, reflux condenser and 2 dropping funnels is charged with 460 parts of water free from electrolytes, and flushed with nitrogen. Then the water is heated to 45° C., and a solution of 0.9 part of ammonium persulfate in 20 parts of water and 50% of a solution of 15 parts of n-decanephosphonic acid in 200 parts of water, which acid solution had been adjusted to a pH of 6.8 by means of a 20% potassium hydroxide solution are added. The inner temperature is adjusted to 60° C., and 750 parts of vinyl acetate and the remaining 50% of the n-decanephosphonic acid solution are added in dosed quantities within 3 hours. Subsequently, a solution of 0.45 part of ammonium persulfate in 30 parts of water is added; then the inner temperature is raised to 75° C., and the mixture is agitated for 1 hour and then cooled to room temperature while stirring. A low-viscosity, very fine-particle and coagulate-free polyvinyl acetate dispersion is obtained which has a solids content of 50.2%, a minimum film-forming temperature of 15° C. and a pH of 5.7. The polymer has a reduced specific viscosity of 5.6 dl/g (measured at 25° C. in dimethyl formamide).

400 Parts of the above polyvinyl acetate dispersion are stirred with 34.2 parts of a 16.3% aqueous solution of the ammonium salt of a styrene/maleic anhydride copolymer having a molecular weight of 1,900 at a molar ratio of styrene units to maleic anhydride units of 3:1. The resulting mixture is mixed with agitation with 12 parts of a 50% aqueous emulsion of polypropyleneglycol having a molecular weight of 1,750, and a plastics dispersion in accordance with the invention is thus obtained.

EXAMPLE 2: (Example of Application)

In a vessel provided with agitator, 1,000 parts of kaolin, 80% of which have a particle diameter of less than 2 μm and 0.2% of which have a particle diameter of more than 10 μm are dispersed in a dispersing medium consisting of 570 parts of water, 1 part of caustic soda, 1 part of sodium polyacrylate and 2 parts of pentasodium tripolyphosphate while stirring for 10 minutes at an agitating speed of 5,000 rpm. A solution of 60 parts of starch in 140 parts of water free from electrolytes which had been prepared at 90° C. and cooled to 40° C. is stirred into this kaolin dispersion. The mixture obtained is then mixed at room temperature with 200 parts of the finished plastics dispersions according to Example 1.

The resulting composition contains kaolin and vinyl ester polymer in a ratio of 10:1; it can be easily spread out and is therefore suitable as paper spread coating composition. The viscosity of the composition is first 1.60 Pa·s and 1 day later 2.96 Pa·s (measured according to Brookfield at 50 rpm). Compositions prepared in analogous manner on the basis of a commercial dispersion of a styrene/butadiene copolymer or a styrene/butylacrylate copolymer instead of polyvinyl acetate, without however the addition of styrene copolymer salt and polypropyleneglycol, have a Brookfield viscosity of 1.92 Pa·s and 2.96 Pa·s, and 1.80 Pa·s and 2.52 Pa·s, respectively.

EXAMPLE 3:

500 Parts of water free from electrolytes are introduced into the vessel as described in Example 1, flushed with nitrogen and heated to a temperature of 45° C. Subsequently, 11% of a solution (I) of 9 parts of n-decanephosphonic acid and 3 parts of 1-hydroxyethane-1,1-diphosphonic acid in 100 parts of water, which solution had been adjusted to a pH of 6.8 by means of 20% sodium hydroxide solution, and a solution of 0.9 part of ammonium persulfate in 20 parts of water are added. The inner temperature is raised to 60° C., and a mixture of 600 parts of vinyl acetate and 150 parts of a commercial mixture of vinyl esters of tertiary, saturated, aliphatic carboxylic acids having 10 carbon atoms is added in dosed quantities within 3 hours. Within the same period of time, the remaining 89% of solution (I) are dosed in. After subsequent addition of a solution of 0.45 part of ammonium persulfate in 30 parts of water, the inner temperature is raised to 75° C. During the heating and within the first 30 minutes after having attained the temperature of 75° C., a solution (II) of 6 parts of n-decanephosphonic acid and 2 parts of 1-hydroxyethane-1,1-diphosphonic acid in 60 parts of water, which solution had been adjusted to a pH of 6.8 by means of 20% sodium hydroxide solution, is added in dosed quantities. Subsequently, the reaction mixture is agitated for a further 30 minutes at 75° C., and then cooled to room temperature while stirring. A low-viscosity, fineparticle copolymer dispersion having a solids content of 52.1% and a pH of 5.4 is obtained. The average diameter of the copolymer particles is 0.23 μm. The copolymer has a reduced specific viscosity of 6.17 dl/g (measured at 25° C. in dimethyl formamide).

The copolymer dispersion obtained is adjusted to a pH of 8 by means of concentrated ammonia solution.

150 Parts of this dispersion are stirred with 15 parts of a 15% aqueous solution of the styrene copolymer salt used in Example 1. The resulting mixture is then blended with 11.25 parts of a 20% aqueous emulsion of the polypropyleneglycol used in Example 1.

EXAMPLE 4: (Example of Application)

According to Example 2, 1,000 parts of kaolin are dispersed in a dispersing medium consisting of of 540 parts of water, 1 part of caustic soda and 3 parts of sodium polyacrylate. The resulting 65% kaolin dispersion has a pH of 8. 618 Parts of this dispersion are mixed with 80 parts of the finished plastics dispersion according to Example 3.

The resulting composition contains kaolin and vinyl ester polymer in a ratio of 10:1; it is easily spread out and thus suitable as paper spread coating composition. The Brookfield viscosity of the composition (measured at 50 rpm) is 0.55 Pa·s. A composition prepared in analogous manner on the basis of a commercial dispersion of a styrene/butadiene copolymer but without addition of styrene copolymer salt and polypropyleneglycol has a Brookfield viscosity of 1.32 Pa·s.

EXAMPLE 5

10,000 Parts of water free from electrolytes are drawn by vacuum into an autoclave provided with agitator, and the water is washed with nitrogen while stirring. 20 Bars of ethylene are then pressed in, and the temperature in the autoclave is adjusted to 45° C. Next, 25% of a solution (I) of 19 parts of sodium sulfite and 175 parts of n-decanephosphonic acid in 2,000 parts of water, which solution had been adjusted to a pH of 6.8 by means of 50% sodium hydroxide solution, is added in dosed quantities simultaneously with 1,270 parts of vinyl acetate within 10 minutes. Subsequently, a solution of 45 parts of ammonium persulfate in 400 parts of water is added in dosed quantities, and the inner temperature is adjusted to 60° C. Within 6 hours, the remaining 75% of the solution (I) and further 11,430 parts of vinyl acetate are added; the ethylene pressure is maintained at 20 bars by pressing in further ethylene, and the inner temperature is kept at 60° C. by exterior cooling. The ethylene feed is then stopped; a solution of 15 parts of ammonium persulfate in 600 parts of water is added in dosed quantities, and the contents of the autoclave are heated to 85° C. During the heating and within the first 30 minutes after having attained 85° C., a solution (II) of 130 parts of n-decanephosphonic acid in 1,170 parts of water, which solution had been adjusted to a pH of 6.8 by means of 50% sodium hydroxide solution, is metered in, and agitation of the reaction mixture is continued at 85° C. for a further 30 minutes before it is finally cooled with agitation to room temperature. A fine-particle, low-viscosity copolymer dispersion being stable to shearing forces is obtained which has a solids content of 51.5%, a pH of 4.8; the copolymer has an ethylene content of 14.2% and a reduced specific viscosity of 2.98 dl/g (measured at 25° C. in dimethyl formamide).

The copolymer dispersion obtained is adjusted to a pH of 8 by means of concentrated ammonia solution. 2,500 Parts of this dispersion are mixed with 215 parts of the styrene copolymer salt solution according to Example 1 and 75 parts of the polypropyleneglycol emulsion according to Example 1.

EXAMPLE 6

Operations are as in Example 5; the ethylene pressure being however 45 bars and the polymerization temperature 53° C. A low-viscosity, fine-particle copolymer dispersion stable to shearing forces is obtained, which has a solids content of 52.7% and a pH of 4.5. The average diameter of the copolymer particles is 0.20 μm. The copolymer contains 18.7% of ethylene and has a reduced specific viscosity of 10.2 dl/g (measured in dimethyl formamide at 25° C.).

According to Example 5, the copolymer dispersion obtained is adjusted to a pH of 8 and mixed with styrene copolymer salt solution and polypropyleneglycol emulsion.

EXAMPLES 7 to 10: (Examples of Application)

According to Example 2, the plastics dispersions obtained according to Examples 5 and 6 are blended each with the kaolin dispersions used in Examples 2 and 4. The compositions resulting in each case contain kaolin and vinyl ester polymer in a ratio of 10:1; they can be easily spread out and are thus suitable as paper spread coating compositions. Their Brookfield viscosity (measured at 50 rpm) is listed in the following Table 1.

TABLE 1

|  | Example | | | |
|---|---|---|---|---|
|  | 7 | 8 | 9 | 10 |
| Vinyl ester polymer | ET/VA-Cop | ET/VA-Cop | ET/VA-Cop | ET/VA-Cop |
| ET content (%) | 14.2 | 14.2 | 18.7 | 18.7 |
| RSV (dl/g) | 2.98 | 2.98 | 10.2 | 10.2 |
| Styrene/Cop salt | of Ex. 1 | of Ex. 1 | of Ex. 1 | of Ex. 1 |
| Kaolin dispersion | of Ex. 2 | of Ex. 4 | of Ex. 2 | of Ex. 4 |
| Brookfield viscosity (Pa·s) | 0.52 | 2.84 | 0.74 | 4.44 |

EXAMPLE 11

Operations are as in Example 5; the ethylene pressure however being 45 bars and the polymerization temperature 53° C.; furthermore, decanephosphonic acid-monomethyl ester is now used instead of decanephosphonic acid. A low-viscosity, fine-particle copolymer dispersion having a solids content of 54.4% and a pH of 4.5 is obtained. The copolymer contains 22% of ethylene and has a reduced specific viscosity of 18.0 dl/g (measured at 25° C. in dimethyl formamide).

According to Example 1, the copolymer dispersion obtained is blended with styrene copolymer salt solution and polypropyleneglycol emulsion.

EXAMPLE 12

Operations are as in Example 5; the ethylene pressure however being 45 bars and the polymerization temperature 53° C.; furthermore, instead of the total 12,700 parts of vinyl acetate, a mixture of 8,890 parts of vinyl acetate and 3,810 parts of vinyl chloride, and instead of decanephosphonic acid, decanephosphonic acid-monomethyl ester are used. A low-viscosity and very fine-particle terpolymer dispersion having a solids content of 50.5% and a pH of 4.6 is obtained. The average particle size of the terpolymer is 0.16 μm, and the reduced specific viscosity of the terpolymer is 2.55 dl/g (measured at 25° C. in dimethyl formamide).

According to Example 1, the terpolymer dispersion obtained is blended with styrene copolymer salt solution and polypropyleneglycol emulsion.

EXAMPLES 13 and 14: (Examples of Application)

According to Example 2, the plastics dispersions obtained according to Examples 11 and 12 are blended each with the kaolin dispersion containing starch as used in Example 2. The resulting compositions contain kaolin and vinyl ester polymer in a ratio of 10:1, they can be easily spread out and are thus suitable as paper spread coating compositions. Their Brookfield viscosity (measured at 50 rpm) is listed in the following Table 2.

TABLE 2

|  | Example | |
|---|---|---|
|  | 13 | 14 |
| Vinyl ester polymer | ET/VA Cop | ET/VA/VC Terp |
| RSV (dl/g) | 2.55 | 18.0 |
| Styrene/Cop salt | of Ex. 1 | of Ex. 1 |
| Kaolin dispersion | of Ex. 2 | of Ex. 2 |
| Brookfield viscosity (Pa·s) |  |  |
| immediately | 0.82 | 0.86 |
| after 1 day | 0.60 | 0.62 |

EXAMPLE 15

10,000 parts of water free from electrolytes are drawn by vacuum into an autoclave provided with agitator, and the water is washed with nitrogen while stirring. 20 Bars of ethylene are then pressed in, and the temperature in the autoclave is adjusted to 45° C. Next, 25% of a solution (I) of 19 parts of sodium sulfite, 180 parts of sodium lauryl sulfate and 60 parts of tris(phosphonomethyl)amine in 2,000 parts of water, which solution had been adjusted to a pH of 6.8 with concentrated aqueous ammonia, are metered in within 10 minutes. The 10% of a mixture of 8,890 parts of vinyl acetate and 3,810 parts of vinyl chloride are added, the ethylene pressure is raised to 45 bars and, after addition of a solution of 45 parts of ammonium persulfate in 400 parts of water, the internal temperature is adjusted to 60° C. Within 6 hours the remaining 75% of solution (I) and the remaining 90% of the VA/VC mixture are metered in, while the ethylene pressure is maintained at 45 bars by adding ethylene. Then the addition of ethylene is discontinued, a solution of 15 parts of ammonium persulfate in 600 parts of water is metered in and the contents of the autoclave are heated to 85° C. During the heating and during the first 30 minutes at 85° C. a solution (II) of 120 parts of sodium lauryl sulfate and 40 parts of tris(phosphonomethyl)-amine in 1,170 parts of water, which solution has been adjusted to pH 6.8 by adding concentrated aqueous ammonia solution, is metered in, whereupon the reaction mixture is stirred for another 30 minutes at 85° C. and finally cooled to 30° C. while stirring. A fine-particle, low-viscosity ET/VA/VC terpolymer dispersion stable to shearing and having a solids content of 51.1%, a minimum film-forming temperature of 7° C., a viscosity of 40 mPa·s and a pH of 5.0 is obtained. The polymer particles have an average diameter of 0.169 μm. The terpolymer has an ethylene content of 12.3% and an RSV value of 3.42 dl/g (measured at 25° C. in dimethyl formamide). The terpolymer dispersion obtained is adjusted to a pH of 8 by means of concentrated ammonia solution. 2,500 parts of this dispersion are blended according to Example 1 with 215 parts of the styrene copolymer salt solution and 75 parts of the polypropyleneglycol emulsion, each according to Example 1.

EXAMPLE 16: (Example of Application)

According to Example 2, the plastics dispersion obtained according to Example 15 is mixed with the kaolin dispersion containing starch used in Example 2. The resulting composition can be easily spread out and is thus suitable as paper spread coating composition. The Brookfield viscosity of the composition is 2.0 Pa·s (measured at 50 rpm).

For a comparison, a corresponding composition is prepared, however without addition of styrene copolymer salt and polypropyleneglycol. This composition has a Brookfield viscosity of 80 Pa·s (measured at 50 rpm), and it is non-workable.

EXAMPLES 17 to 21

Operations are as in Example 5; the polymerization temperature being however 50° C. and the ethylene pressure 45 bars; furthermore, instead of decanephosphonic acid, a commercial mixture of esters of phosphoric acid and oxethylated lauric alcohol is used, the acid numbers of which are 110 mg of KOH/g (at pH 5-5.5) and 184 mg of KOH/g (at pH 9-9.5). A low-viscosity, fine-particle copolymer dispersion stable to shearing forces and having a solids content of 54.5% and a pH of 5.4 is obtained. The average particle size of the copolymer is 0.20 μm, and it has a reduced specific viscosity of 7.9 dl/g (measured at 25° C. in dimethyl formamide).

4,000 Parts each of the copolymer dispersion so obtained are mixed with varying amounts of different aqueous styrene copolymer salt solutions and 60 parts each of the polypropyleneglycol emulsion to Example 1. The details are listed in the following Table 3.

TABLE 3

|  | Example | | | | |
|---|---|---|---|---|---|
|  | 17 | 18 | 19 | 20 | 21 |
| Styrene/MA Cop salt | $NH_4$ salt | $NH_4$ salt | DMA salt | $NH_4$ salt | $NH_4$ salt |
| MW | 1,700 | 1,900 | 1,900 | 1,900 | 1,900 |
| MR | 2:1 | 3:1 | 3:1 | 2:1 | 3:1 |
| Amount (parts) | 560 | 690 | 580 | 600 | 520 |
| Salt content (%) | 20.1 | 16.3 | 19.4 | 18.8 | 16.3 |
| pH | 8.1 | 9.3 | 9.5 | 8.7 | 9.3 |
| water (parts) | 85 | — | 65 | 45 | — |
| solids content of mixture (%) | 49.9 | 49.5 | 47.7 | 50.1 | 49.9 |
| pH of mixture | 7.8 | 8.3 | 9.1 | 8.0 | 9.2 |

EXAMPLES 22 to 26: (Examples of Application)

According to Example 2, the plastics dispersions obtained according to Examples 17 to 21 are mixed each with the kaolin dispersions used in Examples 2 and 4. The resulting compositions contain kaolin and vinyl ester polymer in a ratio of 10:1; they are all of low viscosity, easily spreadable and suitable as paper spread coating compositions. Spreadability is unchanged even after a 16 hours' storing as well as after a 16 hours' stirring. The corresponding Brookfield viscosity of the compositions (measured at 50 rpm) is indicated in the following Table 4.

TABLE 4

| Example | Plastics dispersion | Kaolin dispersion | Brookfield viscosity (Pa·s) | | |
|---|---|---|---|---|---|
|  |  |  | imm. | after 16 h | after 16 h of agitation |
| 22 | of Ex. 17 | of Ex. 2 | 1.92 | 2.60 | 1.96 |
|  | of Ex. 17 | of Ex. 4 | 0.64 |  |  |

TABLE 4-continued

| Example | Plastics dispersion | Kaolin dispersion | Brookfield viscosity (Pa's) | | |
|---|---|---|---|---|---|
| | | | imm. | after 16 h | after 16 h of agitation |
| 23 | of Ex. 18 | of Ex. 2 | 1.80 | 2.68 | 1.88 |
| | of Ex. 18 | of Ex. 4 | 0.50 | | |
| 24 | of Ex. 19 | of Ex. 2 | 1.44 | 1.88 | 0.96 |
| | of Ex. 19 | of Ex. 4 | 0.50 | | |
| 25 | of Ex. 20 | of Ex. 2 | 1.84 | 2.48 | 1.10 |
| | of Ex. 20 | of Ex. 4 | 0.60 | | |
| 26 | of Ex. 21 | of Ex. 2 | 1.52 | 1.88 | 1.10 |
| | of Ex. 21 | of Ex. 4 | 0.70 | | |

COMPARATIVE EXAMPLES 1 to 6:

400 Parts each of the copolymer dispersion obtained according to Example 17 are mixed each with 60 parts of the polypropyleneglycol emulsion according to Example 1, either without dispersing agent or with the use of different known dispersing agent salts. The details are indicated in the following Table 5.

TABLE 5

| Comp. Example | Dispersing agent salt | Amount (parts) | Salt content (%) | pH (1) | water (parts) | solids content (%) | pH (2) |
|---|---|---|---|---|---|---|---|
| 1 | — | — | — | — | 420 | 50.1 | 6.8 |
| 2 | Styrene/MA Cop., NH$_4$ salt, MW 1,600 MR 1:1 | 530 | 21.3 | 8.9 | 115 | 49.7 | 8.4 |
| 3 | Ammonium citrate | 564 | 20.0 | 8.9 | 80 | 49.2 | 7.8 |
| 4 | Ammonium polyacrylate | 564 | 20.0 | 10.3 | 80 | 49.8 | 9.3 |
| 5 | Sodium polyvinyl sulfonate | 564 | 20.0 | 9.8 | 80 | 49.6 | 6.9 |
| 6 | Pentasodiumtripoly-phosphate | 564 | 20.0 | 8.0 | 80 | 50.2 | 7.9 |

(1) pH of the dispersing agent salt solution
(2) pH of the mixture

COMPARATIVE Examples 7 to 12:

According to Example 2, the plastics dispersions obtained according to Comparative Examples 1 to 6 each are mixed with the kaolin dispersions obtained according to Examples 2 and 4. The resulting compositions contain kaolin and vinyl ester polymer in a ratio of 10:1. They are of low to high viscosity, and on spreading, their viscosity increases to a very large extent, especially after a 16 hours' storing; after a 16 hours' stirring, they are considerably to badly inhomogeneous. The corresponding Brookfield viscosity of the compositions (measured at 50 rpm) is indicated in the following Table 6.

TABLE 6

| Comp. Example | Plastics dispersion | Kaolin dispersion | Brookfield viscosity (Pa's) | | |
|---|---|---|---|---|---|
| | | | imm. | after 16 h | after 16 h of agitation |
| 7 | of Comp. Ex. 1 | of Ex. 2 | 1.68 | 2.68 | 9.6 |
| | of Comp. Ex. 1 | of Ex. 4 | (1) | | |
| 8 | of Comp. Ex. 2 | of Ex. 2 | incommensurately high | | |
| | of Comp. Ex. 2 | of Ex. 4 | (1) | | |
| 9 | of Comp. Ex. 3 | of Ex. 2 | incommensurately high | | |
| | of Comp. Ex. 3 | of Ex. 4 | (1) | | |
| 10 | of Comp. Ex. 4 | of Ex. 2 | 2.0 | 2.8 | 11.0 |
| | of Comp. Ex. 4 | of Ex. 4 | 1.36 | | |
| 11 | of Comp. Ex. 5 | of Ex. 2 | 3.6 | 12.6 | 9.4 |
| | of Comp. Ex. 5 | of Ex. 4 | (1) | | |
| 12 | of Comp. Ex. 6 | of Ex. 2 | 2.16 | 44.8 | 9.0 |
| | of Comp. Ex. 6 | of Ex. 4 | 0.7 | | |

(1) incommensurately high

EXAMPLE 27

Operations are as in Example 1; however, instead of n-decanephosphonic acid, n-decanephosphonic acid-monomethyl ester is used, the aqueous solution of which is adjusted to a pH of 6.0. A low-viscosity, fine-particle polyvinylacetate dispersion having a solids content of 51.3%, a minimum film-forming temperature of 20° C. and a pH of 5.0 is obtained. The average particle size of the polymer is 0.21 μm. The polymer has a reduced specific viscosity of 5.44 dl/g (measured at 25° C. in dimethyl formamide).

The polyvinyl acetate dispersion obtained is blended according to Example 1 with the styrene copolymer salt solution and polypropyleneglycol emulsion.

EXAMPLE 28: (Example of Application)

According to Example 2, the polyvinyl acetate dispersion obtained according to Example 27 is blended with the starch-containing kaolin dispersion used in Example 2. The resulting composition contains kaolin and vinyl ester polymer in a ratio of 10:1, and it has a solids content of 59%. It can be easily spread out and is thus suitable as paper spread coating composition. The Brookfield viscosity of the composition (measured at 50 rpm) is first 1.44 Pa.s, and after 1 day 1.56 Pa.s.

A composition prepared in analogous manner on the basis of a commercial dispersion of a styrene/butylacrylate copolymer, but without addition of styrene copolymer salt and polypropyleneglycol, has a Brookfield viscosity of 1.80 Pa.s and 1.10 Pa.s, respectively.

What is claimed is:

1. In an aqueous plastics dispersion having a base of a vinyl ester polymer:
   a water-soluble salt of a copolymer of styrene and maleic acid anhydride, semiester or semiamide, the copolymer containing styrene units and comonomer units in a ratio of from 1.5:1 to 6:1,
a hydroxy group-containing polyether which under normal conditions is liquid or water soluble, and
a dispersing agent of a monophosphono-alkane compound of the formula

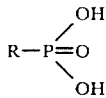

wherein R is alkyl of 6 to 24 carbon atoms, unsubstituted or substituted by a phenyl, hydroxyl or carboxyl.

2. In an aqueous plastics dispersion having a base of a vinyl ester polymer:
a water-soluble salt of a copolymer of styrene and maleic acid anhydride, semiester or semiamide, the copolymer containing styrene units and comonomer units in a ratio of from 1.5:1 to 6:1,
a hydroxy group-containing polyether which under normal conditions is liquid or water-soluble, and
a dispersing agent of a partial ester of a monophosphono-alkane compound of the formula

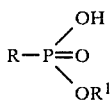

wherein R is alkyl of 6 to 24 carbon atoms, unsubstituted or substituted by phenyl, hydroxyl or carboxyl and $R^1$ is alkyl of 1 to 8 carbon atoms.

3. In an aqueous plastics dispersion having a base of a vinyl ester polymer:
a water-soluble salt of a copolymer of styrene and maleic acid anhydride, semiester or semiamide, the copolymer containing styrene units and comonomer units in a ratio of from 1.5:1 to 6:1,
a hydroxy group-containing polyether which under normal conditions is liquid or water-soluble, and
a dispersing agent of a diphosphono-alkane compound of the formula

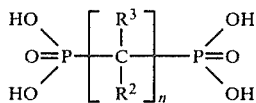

wherein $R^2$ is hydrogen or alkyl of 1 to 8 carbon atoms, $R^3$ is hydrogen, hydroxy or alkyl of 1 to 8 carbon atoms and n is an integer from 1 to 10.

4. In an aqueous plastics dispersion having a base of a vinyl ester polymer:
a water-soluble salt of a copolymer of styrene and maleic acid anhydride, semiester or semiamide, the copolymer containing styrene units and comonomer units in a ratio of from 1.5:1 to 6:1,
a hydroxy group-containing polyether which under normal conditions is liquid or water-soluble, and
a dispersing agent of a tertiary aliphatic amine compound of the formula

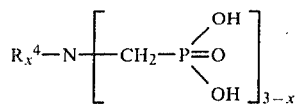

wherein $R^4$ is alkyl of 1 to 6 carbon atoms and x is zero or 1.

5. In an aqueous plastics dispersion having a base of a vinyl ester polymer:
a water-soluble salt of a copolymer of styrene and maleic acid anhydride, semiester or semiamide, the copolymer containing styrene units and comonomer units in a ratio of from 1.5:1 to 6:1,
a hydroxy group-containing polyether which under normal conditions is liquid or water-soluble, and
a dispersing agent of a phosphonomethyl-diamine compound of the formula

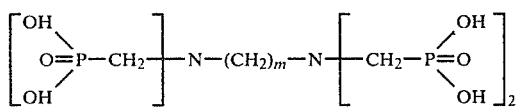

wherein m is an integer from 2 to 14.

6. A paper coating composition comprising a composition based on an aqueous vinyl ester polymer of 40 to 65% by weight based on the weight of the dispersion, said vinyl ester polymer having a film forming temperature of from −10° to 30° C. and said dispersion having a viscosity of 10 to 10,000 m Pa.s; a dispersing agent; a water soluble salt of a copolymer of styrene and maleic acid anhydride semiester or semiamide; said copolymers containing styrene units and comonomer units in a ratio of 1.5:1 to 6:1; a hydroxy containing polyether which under normal conditions is liquid or water-soluble, said polyether being a homo- or copolymer of propylene oxide having a molecular weight of from 200 to 6,000; a pigment; a water-soluble binder; and a dispersing agent of a monophosphono-alkane compound of the formula

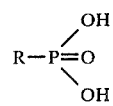

wherein R is alkyl of 6 to 24 carbon atoms, unsubstituted or substituted by a phenyl, hydroxyl or carboxyl.

7. A paper coating composition comprising a composition based on an aqueous vinyl ester polymer dispersion having a solids content of 40 to 65% by weight based on the weight of the dispersion, said vinyl ester polymer having a film forming temperature of from −10° to 30° C. and said dispersion having a viscosity of 10 to 10,000 m Pa.s; a dispersing agent; a water soluble salt of a copolymer of styrene and maleic acid anhydride semiester or semiamide; said copolymers containing styrene units and comonomer units in a ratio of 1.5:1 to 6:1; a hydroxy containing polyether which under normal conditions is liquid or water-soluble, said polyether being a homo- or copolymer of propylene oxide having a molecular weight of from 200 to 6,000; a pigment; a water-soluble binder; and a dispersing agent of a partial ester of a monophosphono-alkane compound of the formula

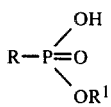

wherein R is alkyl of 6 to 24 carbon atoms, unsubstituted or substituted by phenyl, hydroxyl or carboxyl and $R^1$ is alkyl of 1 to 8 carbon atoms.

8. A paper coating composition comprising a composition based on an aqueous vinyl ester polymer dispersion having a solids content of 40 to 65% by weight based on the weight of the dispersion, said vinyl ester polymer having a film forming temperature of from $-10°$ to $30°$ C. and said dispersion having a viscosity of 10 to 10,000 m Pa.s; a dispersing agent; a water soluble salt of a copolymer of styrene and maleic acid anhydride semiester or semiamide; said copolymers containing styrene units and comonomer units in a ratio of 1.5:1 to 6:1; a hydroxy containing polyether which under normal conditions is liquid or water-soluble, said polyether being a homo- or copolymer of propylene oxide having a molecular weight of from 200 to 6,000; a pigment; a water-soluble binder; and a dispersing agent of a diphosphonoalkane compound of the formula

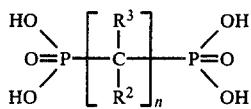

wherein $R^2$ is hydrogen or alkyl of 1 to 8 carbon atoms, $R^3$ is hydrogen, hydroxy or alkyl of 1 to 8 carbon atoms and n is an integer from 1 to 10.

9. A paper coating composition comprising a composition based on an aqueous vinyl ester polymer dispersion having a solids content of 40 to 65% by weight based on the weight of the dispersion, said vinyl ester polymer having a film forming temperature of from $-10°$ to $30°$ C. and said dispersion having a viscosity of 10 to 10,000 m Pa.s; a dispersing agent; a water soluble salt of a copolymer of styrene and maleic acid anhydride semiester or semiamide; said copolymers containing styrene units and comonomer units in a ratio of 1.5:1 to 6:1; a hydroxy containing polyether which under normal conditions is liquid or water-soluble, said polyether being a homo- or copolymer of propylene oxide having a molecular weight of from 200 to 6,000; a pigment; a water-soluble binder; and a dispersing agent of a tertiary aliphatic amine compound of the formula

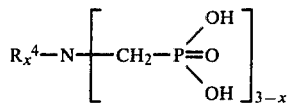

wherein $R^4$ is alkyl of 1 to 6 carbon atoms and x is zero or 1.

10. A paper coating composition comprising a composition based on an aqueous vinyl ester polymer dispersion having a solids content of 40 to 65% by weight based on the weight of the dispersion, said vinyl ester polymer having a film forming temperature of from $-10°$ to $30°$ C. and said dispersion having a viscosity of 10 to 10,000 m Pa.s; a dispersing agent; a water soluble salt of a copolymer of styrene and maleic acid anhydride semiester or semiamide; said copolymers containing styrene units and comonomer units in a ratio of 1.5:1 to 6:1; a hydroxy containing polyether which under normal conditions is liquid or water-soluble, said polyether being a homo- or copolymer of propylene oxide having a molecular weight of from 200 to 6,000; a pigment; a water-soluble binder; and a dispersing agent of a phosphonomethyldiamine compound of the formula

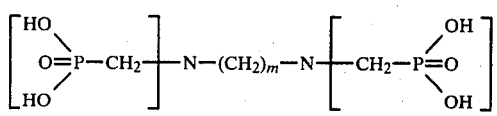

wherein m is an integer from 2 to 14.

11. An aqueous plastics dispersion having a base of a vinyl ester polymer, wherein the vinyl ester polymer is an ethylene-vinyl acetate copolymer,
   a water-soluble salt of a copolymer of styrene and maleic acid anhydride, semiester or semiamide, the copolymer containing styrene units and comonomer units in a ratio of from 1.5:1 to 6:1, and
   a hydroxy group-containing polyether which under normal conditions is liquid or water-soluble.

12. A process for the manufacture of an aqueous plastics dispersion having a base of a vinyl ester polymer of an ethylene-vinyl acetate copolymer, which comprises polymerizing ethylene and vinyl acetate in known manner in an aqueous dispersion, and then mixing the polymer dispersion so obtained with an aqueous solution of a salt of a copolymer of styrene and maleic acid anhydride, semiester or semiamide, the copolymer containing styrene units and comonomer units in a ratio of from 1.5:1 to 6:1 and a hydroxy group-containing polyether.

13. A paper coating composition comprising a composition based on an aqueous vinyl ester polymer dispersion having a solids content of 40 to 65% by weight based on the weight of the dispersion, said vinyl ester polymer having a film forming temperature of from $-10°$ to $30°$ C., said vinyl ester polymer being an ethylene-vinyl acetate copolymer and said dispersion having a viscosity of 10 to 10,000 m Pa.s; a dispersing agent; a water soluble salt of a copolymer of styrene and maleic acid anhydride, a semiester or semiamide, said copolymers containing styrene units and comonomer units in a ratio of 1.5:1 to 6:1; a hydroxy containing polyether which under normal conditions is liquid or water-soluble, said polyether being a homo- or copolymer of propylene oxide hav- a molecular weight of from 200 to 6,000; a pigment; and a water-soluble binder.

14. The dispersion of claim 11, wherein the vinyl ester polymer has a reduced specific viscosity $\eta_{spec}/c$ of from 2 to 30 dl/b as measured at $25°$ C. in dimethyl formamide.

15. The dispersion of claim 11, wherein the polyether is a homo- or copolymer of propylene oxide.

16. The dispersion of claim 11, further including a dispersing agent selected from the group consisting of the salts of polyacrylic acid, polymethacrylic acid, polyvinylsulfonic acid and polyphosphoric acid.

17. The plastics dispersion of claim 11, wherein said hydroxy-containing polyether is polypropylene glycol.

* * * * *